(12) United States Patent
Genco et al.

(10) Patent No.: US 8,653,368 B2
(45) Date of Patent: Feb. 18, 2014

(54) ELECTRICAL WIRE SPLICE SEALING ASSEMBLY AND METHOD

(75) Inventors: Gregory A. Genco, Torrance, CA (US); Laudencio B. Oduca, West Covina, CA (US)

(73) Assignee: Carlisle Interconnect Technologies, Inc., Saint Augustine, FL (US)

( * ) Notice: Subject to any disclaimer, the term of this patent is extended or adjusted under 35 U.S.C. 154(b) by 286 days.

(21) Appl. No.: 13/280,527

(22) Filed: Oct. 25, 2011

(65) Prior Publication Data

US 2012/0103650 A1 May 3, 2012

Related U.S. Application Data

(60) Provisional application No. 61/409,429, filed on Nov. 2, 2010.

(51) Int. Cl.
  *H01R 4/00* (2006.01)
  *H02G 15/02* (2006.01)
  *H01R 4/18* (2006.01)
  *H01R 43/04* (2006.01)
  *H01R 43/20* (2006.01)

(52) U.S. Cl.
  USPC ........ 174/93; 174/77 R; 174/84 C; 174/88 R; 29/871; 29/876

(58) Field of Classification Search
  USPC .......... 174/77 R, 84 C, 88 R, 93; 29/871, 876
  See application file for complete search history.

(56) References Cited

U.S. PATENT DOCUMENTS

| 4,061,872 A * | 12/1977 | DeMonsy et al. ......... 174/138 F |
| 4,501,927 A * | 2/1985 | Sievert ............................ 174/93 |
| 4,684,764 A * | 8/1987 | Luzzi et al. ..................... 174/91 |
| 4,732,628 A * | 3/1988 | Dienes ............................ 156/48 |
| 4,839,470 A * | 6/1989 | Ventura ....................... 174/84 R |
| 5,004,865 A * | 4/1991 | Krupnicki .................... 174/15.7 |
| 5,431,758 A * | 7/1995 | Delalle ........................... 156/49 |

* cited by examiner

*Primary Examiner* — Jeremy Norris
*Assistant Examiner* — Sherman Ng
(74) *Attorney, Agent, or Firm* — Wood, Herron & Evans, LLP

(57) ABSTRACT

A splicing member for sealing a crimped wire splice sleeve without application of high temperatures or chemical reactions is disclosed. The splicing member includes a cylindrical locking member having one or more lock tabs and/or one or more retaining clips. The lock tabs and/or retaining clips are engaged by the insertion of a crimped wire splice sleeve into the splicing member and lock the crimped wire splice sleeve into the splicing member. A rubber sheath is formed around the cylindrical locking member including sealing sections having parallel circular openings concentric with the outer surface of the sheath. The sealing sections prevent environmental conditions from reaching the crimped wire splice sleeve locked inside the cylindrical locking member. For example, moisture is prevented from reaching the crimped wire splice sleeve.

16 Claims, 10 Drawing Sheets

ELECTRICAL WIRE SPLICE SEALING ASSEMBLY AND METHOD

REFERENCE TO RELATED APPLICATIONS

This application claims the benefit of U.S. Provisional Patent Application No. 61/409,429 entitled "Electrical Wire Splice Sealing Assembly and Method" filed on Nov. 2, 2010, which is hereby incorporated by reference.

TECHNICAL FIELD

The present disclosure generally relates to an assembly for splicing electrical wires and mechanically sealing the spliced wires with an insulator to thereby protect the spliced region from external environmental conditions and method for mechanically splicing and sealing electrical wire splices from external environmental conditions.

BACKGROUND

Conventionally, a broken or cut electrical wire is repaired by splicing the two ends of the wire together using various mechanisms and techniques. One mechanism for the repair of a broken or cut wire is to remove the insulation from the two ends of the broken wire that are to be reconnected, inserting the two exposed electrical wires into a metal sleeve and then crimping the two ends of the metal sleeve to both hold the two ends of the wires in place and make a secure electrical connect of the two wires through the metal sleeve. The region of the wires on either side of the crimping sleeve are then sealed from environmental conditions by placing a shrink wrap insulator tube with sealing rings over the crimped sleeve and adjacent regions of the wires on each side of the crimped sleeve. Heat is applied to the heat shrink wrap to cause the insulator tube to shrink and sealing rings to melt and form a seal around the crimped sleeve and wires on either side of the crimped sleeve. Sealing the crimping member with heat-activated shrink wrap involves the use of a second tool during splice repair for the application of high temperatures. Additionally, high temperatures may not be suitable for all repairs. For example, if the repair is of an electrical wire in an aircraft or any other vehicle with a fuel tank, the application of high temperature to cause the heat-activated shrink wrap to shrink and form the seal would first require the evacuation of flammable liquids from the tanks, an expensive and time consuming process. An example of heat-activated shrink wrap for sealing crimping members is shown in FIG. 1. A sheath 102 includes meltable elements 104 on either end of sheath with the sheath positioned around the crimped sleeve. Heat is applied to the sheath 104 to close the ends of the sleeve 102 and seal the spliced region of the wire from external environmental conditions.

Another solution for electrical wire repair is application of a cold-bond sheath. The cold-bond sheath is applied over a crimped sleeve and a chemical reaction seals the crimped sleeve inside the sheath. No heat is applied to the sleeve during repair, reducing safety hazards and reducing complications of the repair. However, a cold-bond sheath assembly has not proved to be a satisfactory solution for many applications.

SUMMARY

According to one embodiment, an apparatus includes a wire splice sleeve and a splicing member having a locking mechanism for securing the wire splice sleeve inside the splicing member.

In one embodiment, the locking mechanism may be one or more lock tabs for engaging the wire splice sleeve and securing the wire splice sleeve in the splicing member. In another embodiment, the locking mechanism may be one or more retaining clips for engaging the wire splice sleeve and securing the wire splice sleeve in the splicing member. The retaining clips may be located on a cylindrical locking member. In yet another embodiment, the locking mechanism may include one or more lock tabs and one or more retaining clips. The lock tabs may be located on a cylindrical locking member.

In further embodiments, the splicing member may include a sheath positioned around the cylindrical locking member. The sheath may include a sealing section, such as a rubber grommet, on each end to isolate the wire splice sleeve, once inserted into the splicing member, from the environment outside the sheath.

According to another embodiment, a method includes sliding a splicing member onto an insulated portion of a first wire with the portion of the first wire to be spliced extending out of one end of the splicing member; inserting the exposed end of the first wire into a first end of a conductive wire splice sleeve; inserting the exposed end of a second wire to be spliced into the a second end of the wire splice sleeve; crimping the wire splice sleeve on the first end to make electrical and mechanical connection with the first wire; crimping the wire splice sleeve on the second end to make mechanical and electronic connection to the second wire; and sliding the splicing member along the first wire over the crimped wire splice sleeve until a locking member of the sealing sheath engages with the crimped wire splice sleeve to lock the sealing sheath in place over the crimped wire splice sleeve so as to protect the crimped wire splice sleeve and the first and second wires coupled to the crimped wire splice sleeve. The method may be performed without the application of high temperature or the application of chemical reactions.

According to yet another embodiment, a product produced by the process of forming a cylindrical locking member with at least one lock tab. The product is further produced by the step of forming a sheath covering an outer surface of the cylindrical locking member and extending beyond the cylindrical locking member. The product is further produced by the step of molding the sheath to include at least one sealing ring in a sealing section extending beyond the cylindrical locking member in which the sealing ring is concentric with an outer surface of the sheath.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings.

DETAILED DESCRIPTION

An exemplary splicing member may include a locking mechanism for locking a rubber sheath onto a crimped wire splice sleeve. The exemplary splicing member may include sealing sections on the rubber sheath for sealing the crimped wire splice sleeve from the environment. The locking mechanism may include, for example, a lock tab and/or a retaining clip. Such an exemplary splicing member may be applied during repair of wire splices without applying heat or causing a chemical reaction. Thus, the splicing member may be appropriate for use under hazardous conditions. For example, the splicing member may repair electrical connections in airplanes without evacuating fuel from the airplane. Additionally, the exemplary splicing member may be capable of withstanding temperatures up to and in excess of 230 degrees Celsius.

Figure 1:
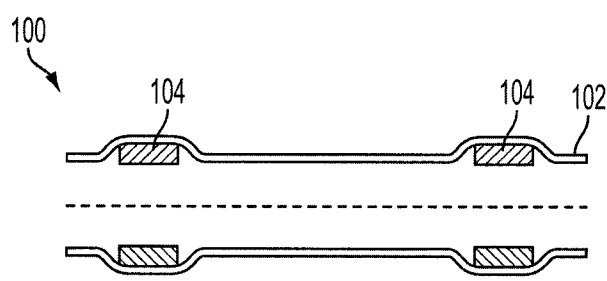
FIG. 1 is a cross-sectional view illustrating a conventional wire splice connector for a crimping member.
Figure 2:
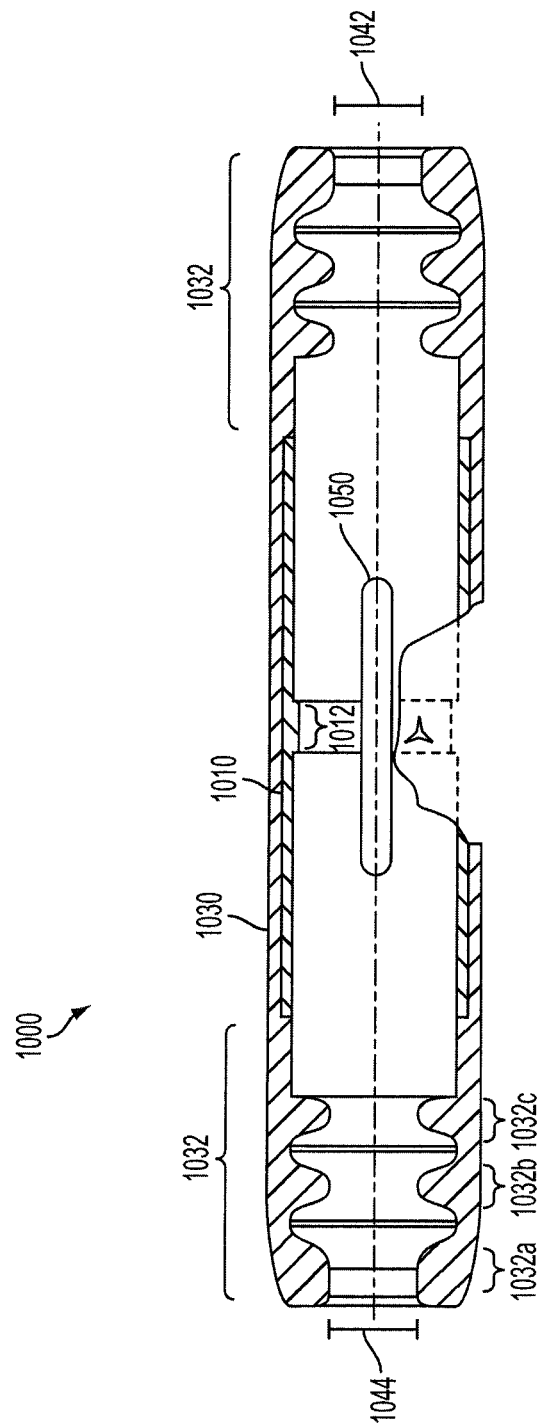
FIG. 2 is a cross-sectional view illustrating an exemplary splicing member with a lock tab for sealing a crimped wire splice sleeve according to one embodiment of the disclosure.

FIG. 2 is a cross-sectional view illustrating an exemplary splicing member with a lock tab for sealing a crimped wire splice sleeve according to one embodiment of the disclosure. A splicing member 1000 includes a sheath 1030 surrounding a cylindrical locking member 1010. The sheath 1030 includes sealing sections 1032. The cylindrical locking member 1010 includes a lock tab 1012. According to one embodiment, the sealing sections 1032 may include a conical tapering sloped towards wire insertion ends 1042 and 1044 of the sealing sections 1032. The conical sealing sections 1032 may assist in the removal of moisture from a surface of the sheath 1030. According to one embodiment, the cylindrical locking member 1010 may be a plastic material, and the sheath 1030 may be a rubber material formed on the cylindrical locking member 1010. The cylindrical locking member 1010 and the sheath 1030 may be substantially inseparable. According to one embodiment, the splicing member 1000 may include one or more slots 1050.

Figure 3A:
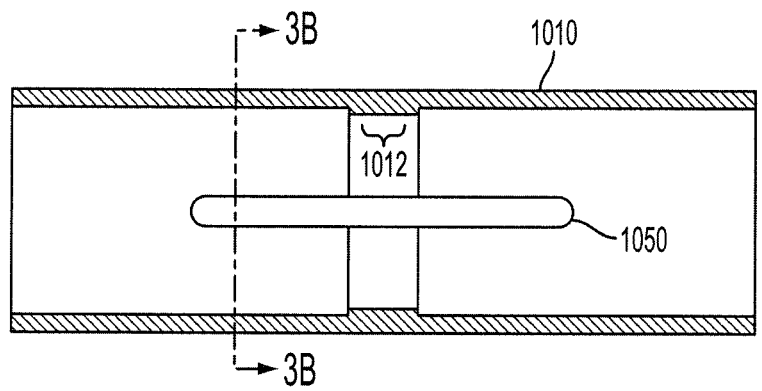
FIG. 3 is a schematic illustrating a cylindrical locking member according to one embodiment of the disclosure.
Figure 3B:
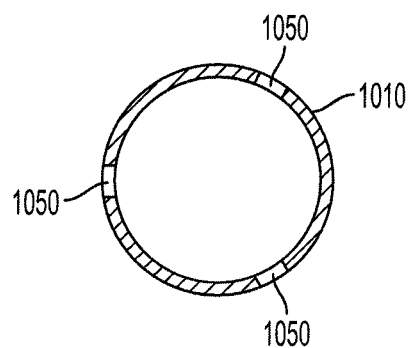

The lock tab 1012 of the splicing member 1000 may be designed with a size and shape significantly similar to a groove and/or notch of a crimped wire splice sleeve (not shown) for insertion into the splicing member 1000. For example, if the width of a groove or the width between notches on a crimped wire splice sleeve is approximately five thousands of an inch, the width of the lock tab 1012 may also be approximately five thousands of an inch. According to one embodiment, the lock tab 1012 may protrude from the cylindrical locking member 1010 around the entire circumference of the cylindrical locking member 1010. According to another embodiment, the lock tab 1012 may have one or more protrusions from the cylindrical locking member 1010 along the inner surface of the cylindrical locking member 1010. Additional details of the cylindrical locking member 1010 are illustrated in FIG. 3. FIG. 3 is a schematic illustrating a cylindrical locking member according to one embodiment of the disclosure.

Referring back to FIG. 2, the height of the lock tab 1012 may be selected to be large enough to provide an opposing force to retain the crimped wire splice sleeve inside the splicing member 1000 and may be selected to be small enough to allow insertion of the crimped wire splice sleeve into the splicing member 1000. Although only one lock tab is illustrated in FIG. 2, more or less lock tabs may be present in a splicing member.

According to another embodiment, the cylindrical locking member 1010 may include lock tabs at opposite ends of the cylindrical locking member 1010. For example, a lock tab such as, for example, a hook may be placed at opposite ends to engage an inserted crimped wire splice sleeve. The hooks may include a surface sloped towards the wire entry openings 1042 and 1044 such that a crimped wire splice sleeve may be inserted through one of the wire entry openings 1042 and 1044, but after the wire engages the lock tab the lock tab provides an opposing force to prevent the withdrawal of the crimped wire splice sleeve.

Figure 4:
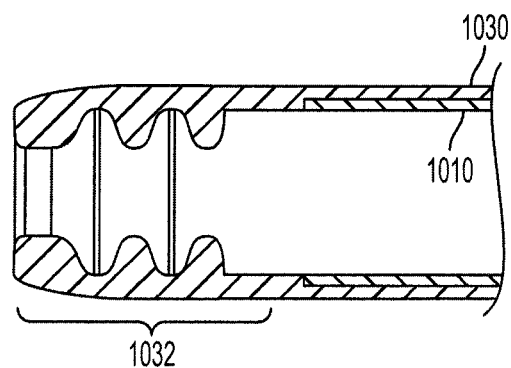
FIG. 4 is a schematic illustrating a sealing section according to one embodiment of the disclosure.

The splicing member 1000 may include the sealing sections 1032. The sealing sections 1032 include a number of sealing rings 1032a, 1032b, 1032c concentric with a circumference of the splicing member 1000. The sealing rings 1032a-c may be placed substantially in parallel to allow insertion of a wire through the sealing rings 1032a-c. The sealing rings 1032a-c may seal the cylindrical locking member 1010 and an inserted crimped wire splice sleeve from the environment outside the sheath 1030. For example, the sealing rings 1032*a-c* may prevent moisture from reaching the cylindrical locking member 1010. Although three parallel sealing rings 1032*a-c* are illustrated in FIG. 2, more or less sealing rings may be present on the sheath 1030. When a wire is inserted through the sealing rings 1032*a-c*, the sealing rings 1032*a-c* may compress to form a seal around the insulator of the inserted wire similar to an o-ring seal. According to one embodiment, the sealing sections 1032 may have a conical shape (not shown) sloping towards the wire entry openings 1042 and 1044. The conical shape may assist in the removal of moisture from the surface of the splicing member 1000. Additional details of the sealing sections 1032 are illustrated in FIG. 4. FIG. 4 is a schematic illustrating a sealing section according to one embodiment of the disclosure.

Figure 5:
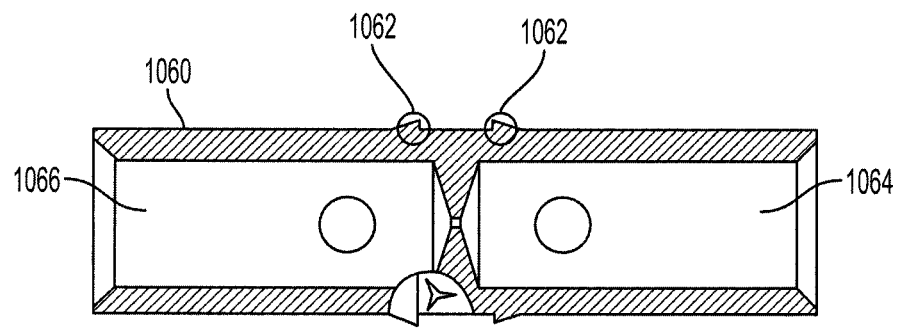
FIG. 5 is a schematic illustrating a wire splice sleeve according to one embodiment of the disclosure.

FIG. 5 is a schematic illustrating a wire splice sleeve according to one embodiment of the disclosure. A wire splice sleeve 1060 includes notches 1062 for locking into a splicing member, such as the splicing member 1000 of FIGS. 2-4. The wire splice sleeve 1060 also includes cavities 1064 and 1066 for the insertion of a first wire splice and a second wire splice, respectively. After the first and second wire splices (not shown) are inserted into the wire splice sleeve 1060 the sleeve 1060 may be crimped on the first wire splice and the second wire splice. Crimping the wire splices in the wire splice sleeve 1060 forms an electrical and/or mechanical connection. According to one embodiment, the wire splice sleeve 1060 is made of a conductive material such that a circuit is formed between the first wire splice and the second wire splice.

Figure 6:
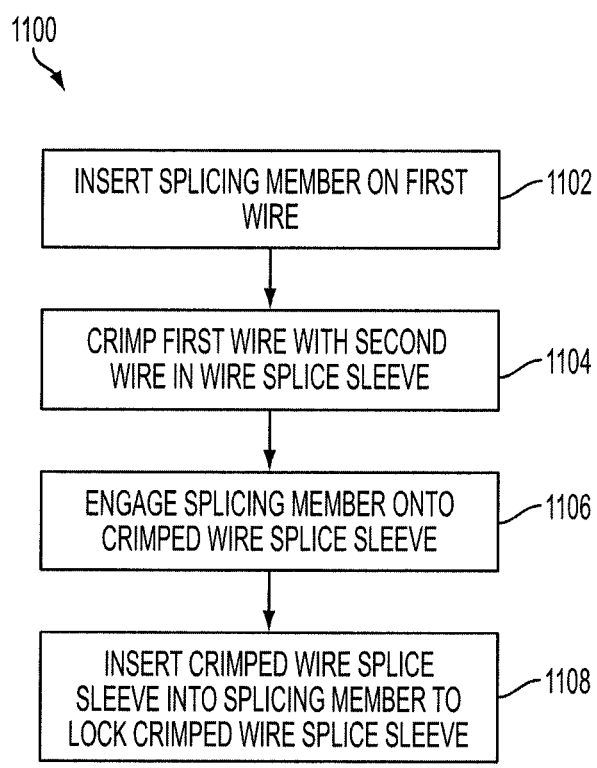
FIG. 6 is a flow chart illustrating an exemplary method of sealing a crimped wire splice sleeve with a splicing member according to one embodiment of the disclosure.
Figure 7:
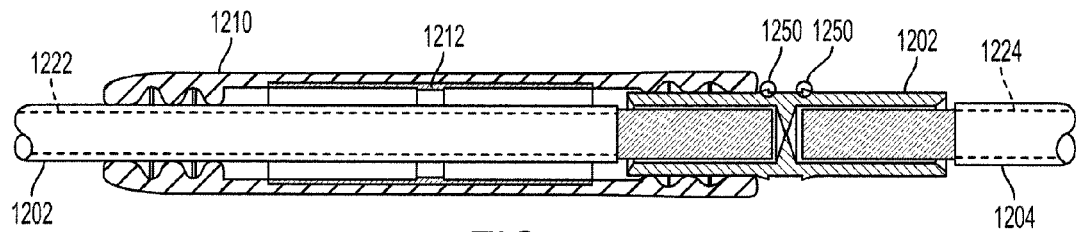
FIG. 7 is a cross-sectional view illustrating application of a splicing member to a crimped wire splice sleeve at initial entry according to one embodiment of the disclosure.
Figure 8:
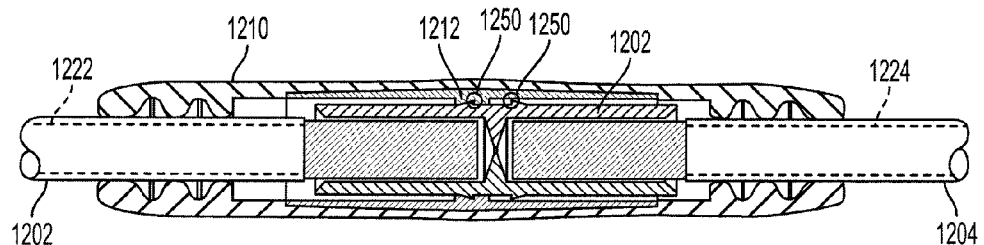
FIG. 8 is a cross-sectional view illustrating application of a splicing member to a crimped wire splice sleeve before locking according to one embodiment of the disclosure.
Figure 9:
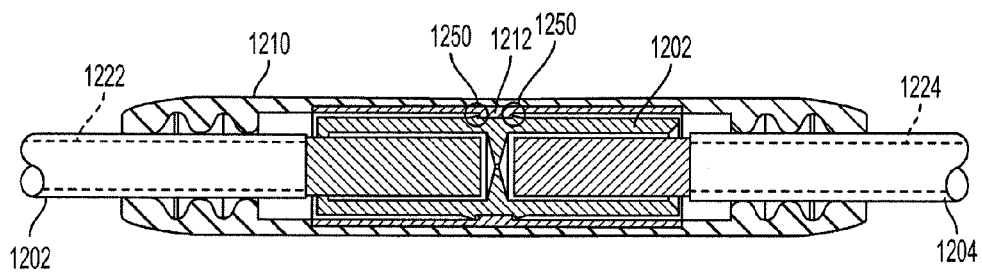
FIG. 9 is a cross-sectional view illustrating application of a splicing member to a crimped wire splice sleeve after locking according to one embodiment of the disclosure.

A method of repairing a wire splice using the exemplary splicing member is described in the flow chart of FIG. 6 and the illustrations of FIGS. 7-9. FIG. 6 is a flow chart illustrating an exemplary method of sealing a crimped wire splice sleeve with a splicing member according to one embodiment of the disclosure. A method 1100 begins at block 1102 to insert a splicing member on a first wire splice. At block 1104, the first wire splice is crimped in a crimped wire splice sleeve with a second wire splice. At block 1106, the splicing member is engaged on the crimped wire splice sleeve.

FIG. 7 is a cross-sectional view illustrating application of a splicing member to a crimped wire splice sleeve at initial entry according to one embodiment of the disclosure. A crimped wire splice sleeve 1202 is inserted into a splicing member 1210 having a locking tab 1212. A first conductor 1222 of a first wire 1202 is coupled to a second conductor 1224 of a second wire 1204 through a crimped wire splice sleeve 1202. FIG. 8 is a cross-sectional view illustrating application of a splicing member to a crimped wire splice sleeve before locking according to one embodiment of the disclosure. Before the crimped wire splice sleeve 1202 locks into the splicing member 1210 one of the notches 1250 of the crimped wire splice sleeve 1202 deflects the locking tab 1212.

At block 1108, the crimped wire splice sleeve is inserted into the splicing member to lock the crimped wire splice sleeve in the splicing member. FIG. 9 is a cross-sectional view illustrating application of a splicing member to a crimped wire splice sleeve after locking according to one embodiment of the disclosure. After the crimped wire splice sleeve 1202 locks into the splicing member 1210 the lock tab 1212 is seated between the grooves 1250 of the crimped wire splice sleeve 1202.

Figure 10:
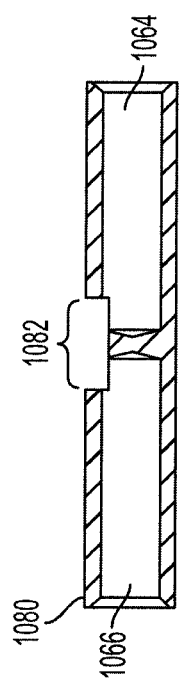
FIG. 10 is a cross-sectional view illustrating a wire splice sleeve according to a second embodiment of the disclosure.
Figure 11:
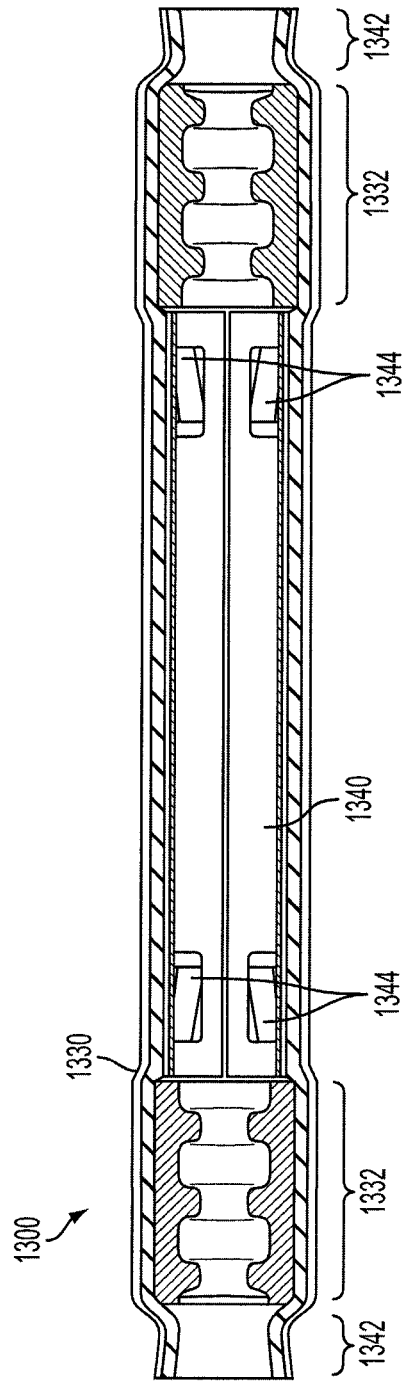
FIG. 11 is a top view illustrating an exemplary splicing member with a retaining clip for sealing a crimped wire splice sleeve according to a second embodiment of the disclosure.
Figure 12:
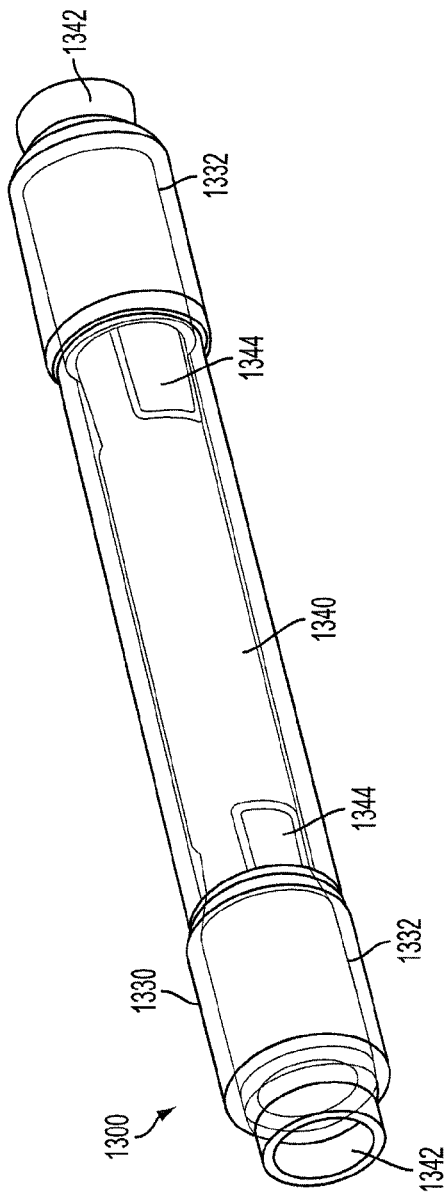
FIG. 12 is a perspective view illustrating the exemplary splicing member according to the second embodiment of the disclosure.

A second embodiment of a wire splice sleeve and splicing member may include a different locking mechanism. For example, the wire splice sleeve may include retention clips in addition to or as an alternate to lock tabs. FIG. 10 is a cross-sectional view illustrating a wire splice sleeve according to a second embodiment of the disclosure. FIG. 11 is a top view illustrating an exemplary splicing member with a retaining clip for sealing a crimped wire splice sleeve according to a second embodiment of the disclosure. FIG. 12 is a perspective view illustrating the exemplary splicing member according to the second embodiment of the disclosure.

A wire splice sleeve 1080 of FIG. 10 includes an indentation 1082. The wire splice sleeve 1080 also includes cavities 1064 and 1066 for receiving a first wire splice and a second wire splice, respectively. A splicing member 1300 of FIGS. 11-12 includes a sheath 1330 with conical-shaped openings 1342 for receiving wire splices. The splicing member 1300 also includes sealing sections 1332, such as rubber seal grommets.

The splicing member 1300 may include one or more locking features. For example, the splicing member 1300 may include a cylindrical retaining clip 1340 having retaining clips 1344. Although not shown, the wire splice sleeve 1080 may include a lock tab for locking into the indentation 1082 of the wire splice sleeve 1080 of FIG. 10. According to one embodiment, the lock tab may have a shape and size significantly similar to that of the indentation 1082. The retaining clips 1344 may be oriented at an angle tilted towards a center axis of the splicing member 1300 to allow insertion of the wire splice sleeve 1080 into the splicing member 1300 but impairing withdrawal of the wire splice sleeve 1080 from the splicing member 1300.

The splicing member 1300 of FIGS. 11-12 and the wire splice sleeve 1080 of FIG. 10 may be used in the repair of wire splices without the application of heat or chemical reactions. According to one embodiment, the method of FIG. 6 may be used for repairing two wire splices with the splicing member 1300 of FIGS. 11-12 and the wire splice sleeve 1080 of FIG. 10.

Figure 13:
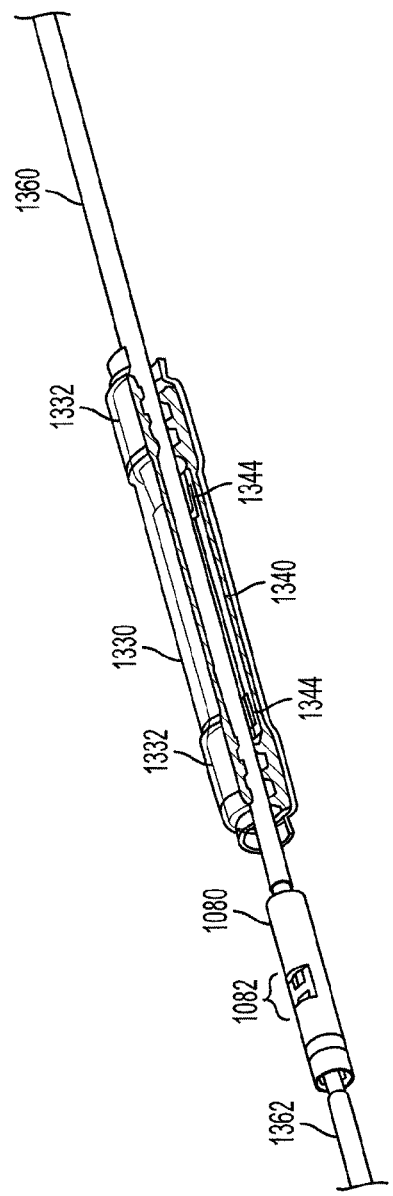
FIG. 13 is a perspective view illustrating application of the splicing member of the second embodiment to a crimped wire splice sleeve before locking according to one embodiment of the disclosure.

FIG. 13 is a perspective view illustrating application of the splicing member of the second embodiment to a crimped wire splice sleeve before locking according to one embodiment of the disclosure. The splicing member 1300 is inserted over a first wire 1360. The wire splice sleeve 1080 is then crimped after inserting the first wire 1360 and a second wire 1362. The wire splice sleeve 1080 may then be inserted into the splicing member 1300.

Figure 14:
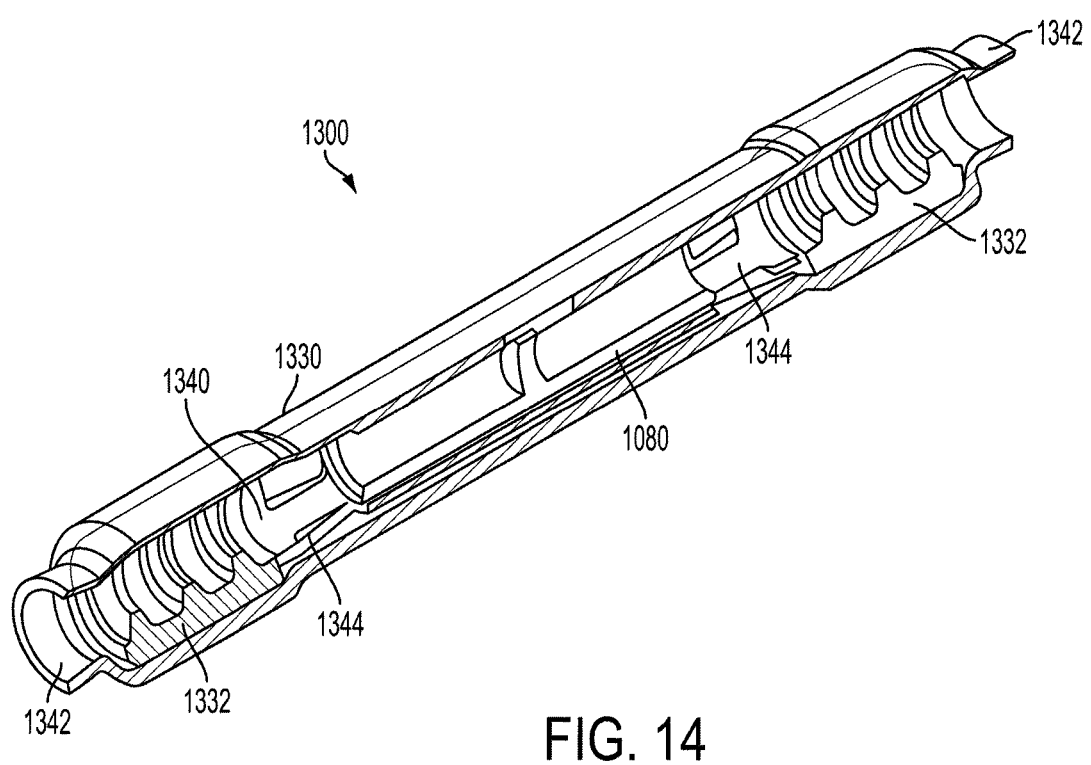
FIG. 14 is a perspective view illustrating application of the splicing member of the second embodiment to a crimped wire splice sleeve after locking according to one embodiment of the disclosure.

FIG. 14 is a perspective view illustrating application of the splicing member of the second embodiment to a crimped wire splice sleeve after locking according to one embodiment of the disclosure. The wire splice sleeve 1080 is locked into the splicing member 1300 by the retaining clips 1344 of the cylindrical retaining clip 1340. The wires (not shown in FIG. 14) extend out from the wire splice sleeve 1080 through the openings 1342. The wire splice sleeve 1080 is sealed from the environment outside of the sheath 1330 by the sealing sections 1332.

Figure 15:
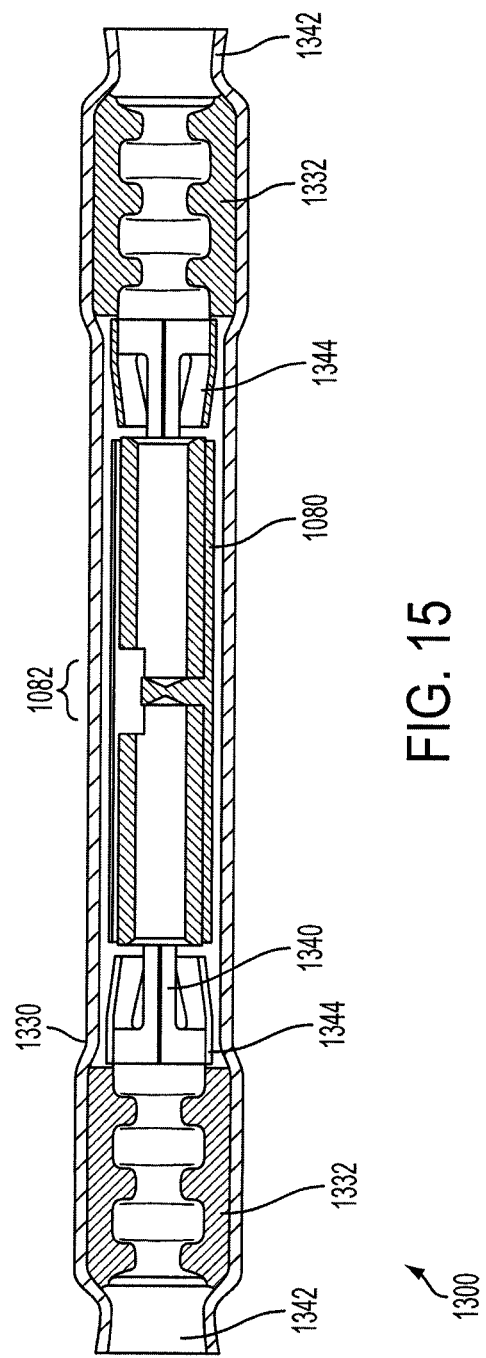
FIG. 15 is a cross-sectional view illustrating application of the splicing member of the second embodiment to a crimped wire splice sleeve after locking according to one embodiment of the disclosure.

FIG. 15 is a cross-sectional view illustrating application of the splicing member of the second embodiment to a crimped wire splice sleeve after locking according to one embodiment of the disclosure. A lock tab (not shown) may be located on the cylindrical retaining clip 1340 for locking into the indentation 1082 of the wire splice sleeve 1080.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
   a wire splice sleeve; and
   a splicing member comprising a locking mechanism for securing the wire splice sleeve inside the splicing member and a sheath around the locking mechanism;
   the sheath including a sealing section at each end thereof and the locking mechanism retained in the interior of the sheath between the sealing sections;
   the locking mechanism including a cylindrical retaining clip having at least one clip angled toward a center axis of the splicing member to allow insertion of the wire splice sleeve into the splicing member and to inhibit the withdrawal of the wire splice sleeve.

2. The apparatus of claim 1, in which the locking mechanism includes at least one lock tab.

3. The apparatus of claim 2, the sheath comprising a sealing section on each end and an opening on each end proximate a respective sealing section.

4. The apparatus of claim 2, in which the lock tab extends around a circumference of an inner surface of the locking mechanism.

5. The apparatus of claim 2, in which the at least one lock tab is engageable by the wire splice sleeve.

6. The apparatus of claim 5, in which a width of the at least one lock tab is approximately equal to a width of a groove on the wire splice sleeve.

7. The apparatus of claim 1, in which an outer surface of the sealing section has a conical shape sloping such that a diameter of a distal end of the sealing section is smaller than a diameter of an inner end of the sealing section near the wire splice sleeve.

8. The apparatus of claim 2, in which the locking member is made of a plastic material.

9. The apparatus of claim 2, in which the sheath is made of a rubber material.

10. The apparatus of claim 1, in which cylindrical retaining clip further comprises at least one lock tab.

11. The apparatus of claim 10, in which the at least one lock tab has a size substantially similar to an indentation of the wire splice sleeve.

12. A method, comprising:
    sliding a splicing member onto an insulated portion of a first wire with the portion of the first wire to be spliced extending out of one end of the splicing member, the splicing member including a locking mechanism and a sheath around the locking mechanism wherein the sheath includes a sealing section at each end thereof with the locking mechanism retained in the interior of the sheath between the sealing sections;
    inserting the exposed end of the first wire into a first end of a wire splice sleeve;
    inserting the exposed end of a second wire to be spliced into a second end of the wire splice sleeve;
    crimping the wire splice sleeve to make electrical and mechanical connection with the ends of both the first and second wires;
    and sliding the splicing member along the first wire over the crimped wire splice sleeve until the locking mechanism of the splicing member engages with the crimped wire splice sleeve, the locking mechanism including a cylindrical retaining clip having at least one clip angled toward a center axis of the splicing member to allow insertion of the wire splice sleeve into the splicing member and to inhibit the withdrawal of the wire splice sleeve to lock the splicing member in place over the crimped wire splice sleeve.

13. The method of claim 12, in which the step of sliding the splicing member to engage the locking mechanism seals the crimped wire splice sleeve in the splicing member.

14. The method of claim 13, in which sealing the crimped wire splice sleeve in the splicing member is performed without heating the splicing member or causing a chemical reaction.

15. The method of claim 12, in which the crimped wire splice sleeve engages at least one lock tab through a groove on an outer surface of the crimped wire splice sleeve having a size approximately similar to the lock tab.

16. The method of claim 15, in which engaging the at least one lock tab of the sealing sheath comprises activating a spring mechanism of at least one lock tab that allows insertion of the crimped wire splice sleeve and that substantially prohibits removal of the crimped wire splice sleeve.

* * * * *